United States Patent [19]

Kimmel

[11] Patent Number: 4,847,723
[45] Date of Patent: Jul. 11, 1989

[54] VOLT-PER-HERTZ PROTECTION APPARATUS

[75] Inventor: Donald S. Kimmel, Monroeville Borough, Pa.

[73] Assignee: Westinghouse Electric Corp., Pittsburgh, Pa.

[21] Appl. No.: 196,697

[22] Filed: May 20, 1988

[51] Int. Cl.[4] .............................................. H02H 3/02
[52] U.S. Cl. ...................................... 361/78; 361/79; 361/86; 361/87; 361/89; 361/94
[58] Field of Search ....................... 361/78, 87, 93, 94, 361/95, 79, 86, 88, 89

[56] References Cited
U.S. PATENT DOCUMENTS
4,731,690  3/1988  Beg et al. .............................. 361/78

Primary Examiner—Derek S. Jennings
Attorney, Agent, or Firm—C. M. Corin

[57] ABSTRACT

An inverse-time timer for a volt/Hertz ratio relay includes a ladder of level detectors associated with a like series of counters connected in cascade with a variable voltage-to-frequency connector responsive to the v/Hz ratio signal for controlling the counters to establish the time delay for tripping.

8 Claims, 6 Drawing Sheets

VOLT-PER-HERTZ PROTECTION APPARATUS

BACKGROUND OF THE INVENTION

The invention relates to a circuit for the protection by a timed relay of apparatus susceptible to an overload, in general, and more particularly to a protection circuit responsive to the volt-per-Hertz ratio exhibited by such apparatus.

It is desirable to maintain a constant volt-per-Hertz ratio on a load which may vary with respect to voltage and frequency. This is the case with a variable speed AC motor drive. The main reason for maintaining a constant ratio resides in the fact that the flux in the air gap is dependent upon such a ratio.

There are cases where such constant ratio cannot be maintained automatically, and protection against excessive magnetic flux requires protection by a relay to shut down the operation of the load, or apparatus, whenever the ratio deviates from a predetermined level. This is the case with an electrical generator driven by a turbine, because the turbine may at times be operated under conditions which are out of range for the generator, for instance at start-up, or under low load conditions. This is also the case with a transformer exposed to strong voltage changes, or frequency variations. In such extreme situations, a relay would shut-down the electrical generator, or open the power supply to the transformer.

Protection of an electrical apparatus by relay is well known. Generally, upon a critical event the relay is given a delay to respond in order to avoid a shut-down if the event is only temporary and the system had time to readjust to normal operation. In general, depending upon the magnitude of the critical parameters to be protected against, the time delay of the relay is made an inverse function of the magnitude of the critical event.

The problem with a protective relay responsive to a volt-per-Hertz ratio is to provide a time function which matches the criticality of the ratio, in other words, the time delay function, if feasible, should at each operative point substantially meet the overload requirement. Accordingly, it is desirable for the user to have a protective relay itself possessing a timer following a predetermined time function between the controlling event representing input and the effective time delay allowed for tripping. In this regard, ideally, the relay should exhibit a time characteristic in response to the expected range of variations of the volt-per-Hertz ratio. Such characteristic is not easily obtained. In contrast, an hyperbolic characteristic is easily achieved with a RC timing circuit. This, however, does not compare favorably with the characteristic required by the user. A simpler solution in the prior art has been to use a relay having a fixed time delay. This solution provides only one point on the required curve. Using two relays of fixed time delay, will provide two points on the desired curve. One relay of shorter time delay is associated with a higher range of volt/Hz ratio variations and a second relay of longer time delay is associated with a lower range of volt/Hz ratios. Such two-step fixed-time delay relay protection also does not account sufficiently for the required response of the relay.

SUMMARY OF THE INVENTION

The present invention resides in using a single instantaneously tripping relay and in interposing, between an input signal representing the volt/Hz variable ratio and such relay, a timer having a plurality of successive time characteristics forming a ladder, each level of the ladder corresponding to one of the successive applicable volt/Hz ratio ranges. The common relay will instantaneously respond after the delay selected by the timer, thus, will respond with a definite characteristic within a corresponding narrow ratio range, whereas the overall relay characteristic will remain a relatively close approximation of the imposed overall characteristic for the entire volt/Hz ratio range of the input signal. The individual characteristics are chosen so as to be easily designed and logically ordered in a ladder, thereby making the overall combination simpler, precise, effective, less costly, and nevertheless quasi-continuous.

BRIEF DESCRIPTION OF THE PREFERRED EMBODIMENT OF THE INVENTION

DETAILED DESCRIPTION OF THE INVENTION

A volts-per-Hertz protection circuit is illustratively presented such as can be used to protect, against the heating effects due to excessive magnetic flux, motors, generators or transformers, whenever a voltage regulator would operate during underfrequency conditions. If sustained, excessive volts-per-Hertz can result in damage to the transformer and/or generator. This can result from the system frequency having fallen below normal, or there being an overvoltage at normal frequency. The allowable durations of such abnormal condition may be ascertained for the particular equipment and protection by relay can be imposed for any duration thereabove.

Figure 1:
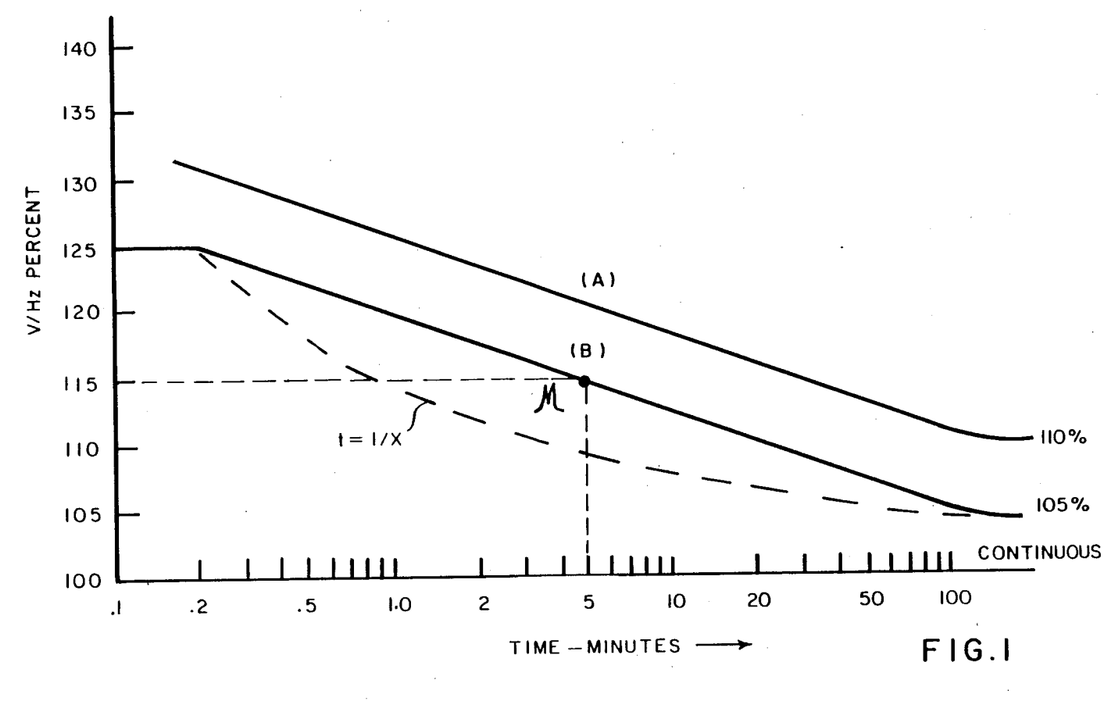
FIG. 1 illustratively shows two imposed volt/Hz ratio to time characteristics for a relay protecting a load or an apparatus exhibiting such volt/Hz ratio variable range. One is applicable to a transformer, the other to a turbine generator.

FIG. 1 shows two characteristic curves A and B, one for a power transformer, the other for a turbine generator. If the overload versus time function is of the form:

$$f(t) = x^n t = k_1$$

where $k_1$ is a constant, x is the overload (expressed in per unit), t is the time (in seconds) and n is an integer, curve B is expressed within a few percent as:

$$t = \frac{72,200}{x^{39}} \text{ or } x^{39}t = 72,200$$

where $k_1 = 72,200$ and $n = 39$; the time axis being defined logarithmically and the characteristic curve being quasi-linear with such time scale.

To generate such a function to a reasonable accuracy with an analog computational circuit is a very difficult task. In fact, with the available analog circuits and the required accuracy, this has only been possible with an exponent n less than 6.

Referring again to the curves of FIG. 1, at 100% for the volt/Hz ratio in percent everything is normal. Should, however, this percentage increase above the level of the axis of FIG. 1, there is a maximum acceptable time to the right which reduces itself progressively toward the left, as the percentage goes to 125% for curve B or to 135% for curve A along the logarithmic scale for the time axis. This scale for the assigned maximum duration of the abnomalous v/Hz ratio goes, typically, from 100 minutes to 1/10 of a minute.

The problem is: how without excessive cost to provide a function generator for such a characteristic. Avoiding the problem, one prior art approach has been to use an electronic volts-per-Hertz protection module designed for operation only on one point of the curve. This amounts to providing only one level detector coupled to a fixed time delay relay to be tripped when such level has been exceeded. Thus a brushless excitation system would receive standard volts/Hertz protection with a one volt/Hz relay to trip the generator after a set time delay. Another approach has been to use two such volts/Hz relays. One relay would trip the generator after a relatively long time delay. The second relay, being set with a higher pickup level, would trip the generator after a shorter time delay. This is, however, a crude kind of protection and quite far from the desired inverse-time response illustrated by the curves of FIGS. 1 and 2. Using a simple RC timing circuit by charging a capacitor in proportion to the overload would yield a response as shown in dotted line below curve B. The dotted line, though, accepts a substantial deviation from the user proposed characteristic of curve B, in the illustration, or of curve A, if there applied.

Figure 2:
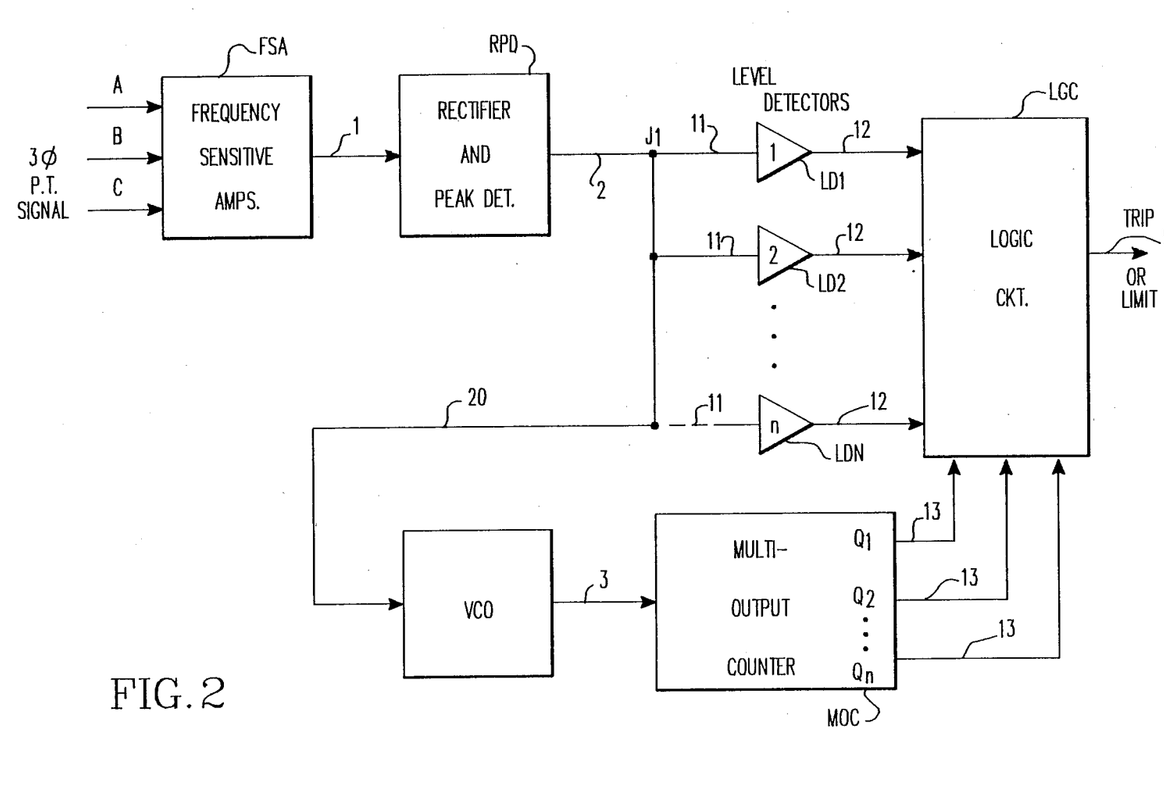
FIG. 2 is a block diagram of a system, according to the present invention, wherein after detection of the volt/Hz ratio the latter is applied to a plurality of channels each affected to one range of the ratio as part of a ladder, while a voltage-to-frequency converter generates pulses applied to a counter multiplexed with the channels to pass in a corresponding channel the count which establishes the intended delay for the relay of the trip circuit.

Referring to FIG. 2, it is now proposed to use a plurality of frequency sensitive operational amplifiers providing an output voltage proportional to both the voltage and the frequency at the input. The outputted signals are thereafter rectified and auctioneered by a peak holding and detector circuit the output of which is a DC voltage proportional to the overload expressed in per unit. Thus, the three-phase AC lines (phases A, B and C) of a power supply, to be disconnected by a protective relay when the voltage/Hz ratio exceeds a set value, are respectively inputted into a matching group of frequency sensitive operational amplifiers (block FSA). A volt/Hz ratio is outputted collectively on line 1 to a rectifier and peak detector circuit RPD. The resulting voltage is applied on line 2 to junction $J_1$ of a ladder comprising a plurality of operational amplifiers (LD$_1$ to LDN) operating as level detectors with regard to the voltage from line 2 to the corresponding input line 11. At the same time, the voltage of line 2 is applied by line 20 to a voltage-controlled oscillator generating on its output line 3 a series of pulses at a frequency proportional to the magnitude of the voltage of line 2. The pulses received on line 3 are counted by a multiple counter MOC, namely a circuit capable of generating several counts classified by stages according to the rank of the magnitude of the voltage at the input. There is a one-to-one relationship between the counters $Q_1$, $Q_2$, . . $Q_n$ outputting on lines 13, and the level detectors LD$_1$, LD$_2$, . . LDN. Accordingly, the logic circuit LGC relates a counter to the corresponding level of the detector in the ladder (as identified by the signal of the corresponding line 12). Such selected counter ($Q_1$, $Q_2$, . . or $Q_n$) will count down accordingly, as stored under the pulses from line 3 and, at the expiration of such count or time delay, it will trigger, by line 5, the relay. Thus, considering curve (B) of FIG. 1, if for an operating point M on the curve, line 1 indicates, for example, a volt/Hz ratio of 115%, the selected counter will provide on line 13 a counting time typically of 5 minutes.

Figure 3A:
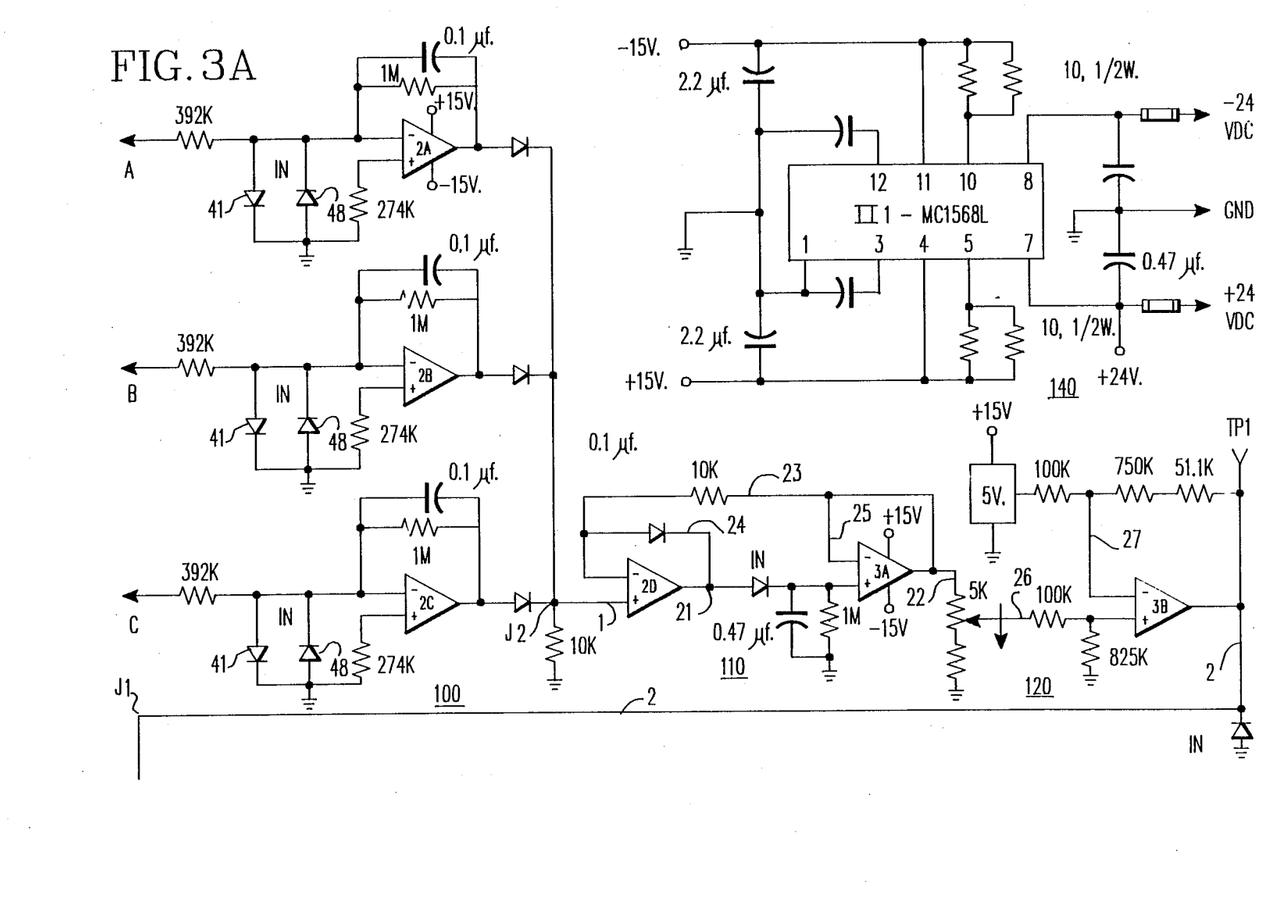
FIGS. 3A and 3B are circuitrys used for the implementation of the block diagram of FIG. 2.
Figure 3B:
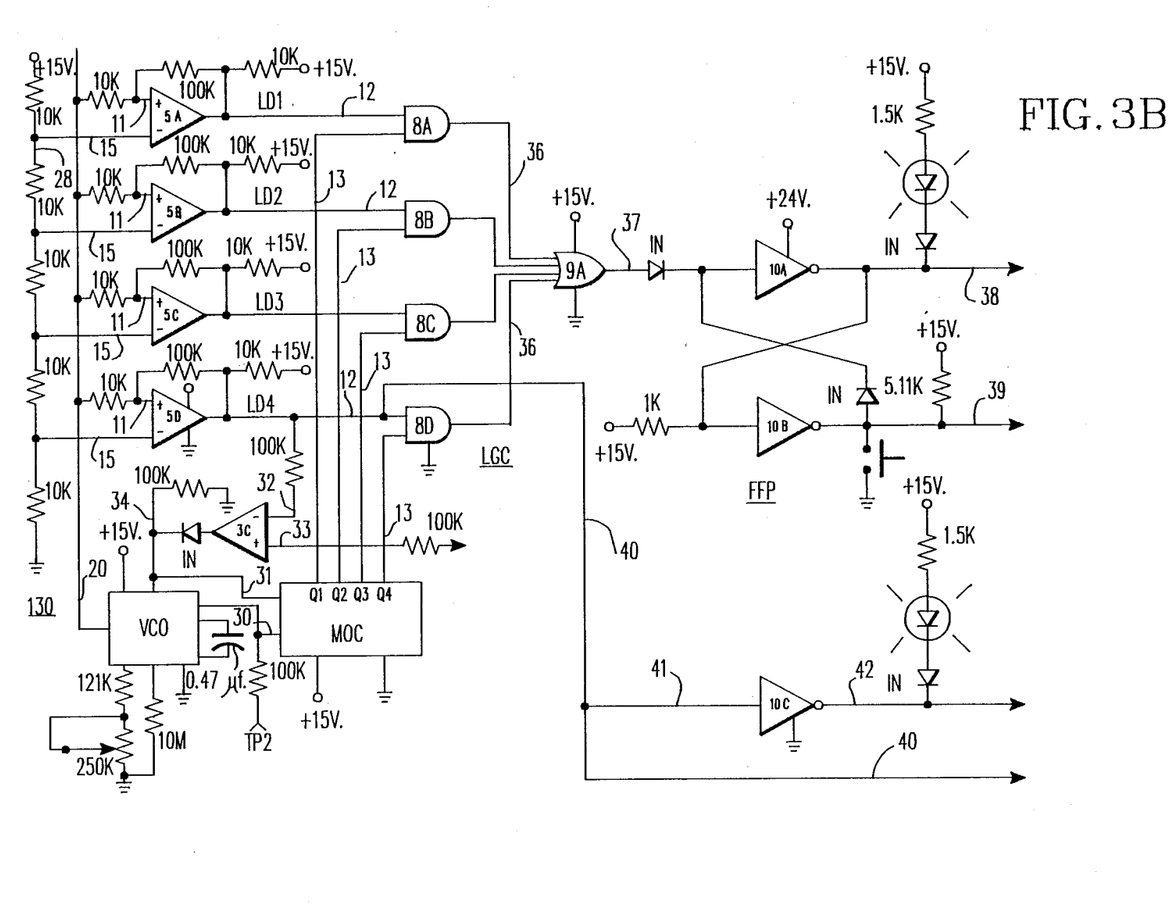

Referring to FIG. 3, the circuitry for the implementation of the blocks of the diagram of FIG. 2 is shown in detail, typically, in the form of an assembly of integrated circuits.

The volt/Hz ratio of an AC power supply is constantly detected by circuit 100. At the input, the three AC line representative phases A, B, C, go into respective frequency sensitive amplifiers 2A, 2B and 2C. As generally known, each includes two opposite polarity rectifying diodes (41 and 48) between the inverting and the non-inverting inputs of the operational amplifier (2A, 2B, 2C) and a tuned feedback link comprising illustratively a 1M resistor in parallel to a 0.1 μf capacitor, so as to generate at the output, beyond a diode (1M 4144) and on a common nodal point $J_2$, a voltage which varies with the volt/Hz ratio experienced by the inputted AC lines. At $J_2$ the output may be 5 volts for a ratio of 1, or 10 volts for a ratio of 2 (meaning, for instance, 100 volts and 50 Hz, or 50 volts and 25 Hz).

From $J_2$ and by line 1, the voltage is applied to a peak holding level shifter circuit 110. Line 1 is connected to the non-inverting input of an operational amplifier 2D, the inverting input of which responds, by line 23, to the output of another operational amplifier 3A and it is linked, via line 24 and a diode, to the output (on line 21) of operational amplifier 2D. Operational amplifier 2D has its output connected to the non-inverting input of operational amplifier 3A. The latter has its output establishing, by line 22, a voltage level defined by a divider line extending from a potential of 15 volts to ground across a potentiometer (5 k) and a resistor (5.11 k). The voltage derived on line 26 from the potentiometer is inputted into a per-unit calibration circuit 120 centered on an operational amplifier 3B. The per-unit voltage, controlled by line 26 at the non-inverting input, is related to the inverting input set at a reference voltage derived from a series resistor-network (100 k, 750 k and 51.1 k) via line 27. The output, on line 2, represents a per-unit value of the volt/Hz ratio.

The object of the present invention is to associate the per-unit value of line 2, which can be read on curve B of FIG. 1 (for instance), with a time delay for tripping which should keep the relationship of the curve of FIG. 1 representing the user's requirement for tripping. This is achieved by choosing respective reference voltages, four in the illustration, each built upon one of lines 15 by a corresponding one of a series of intermediate points belonging to a series network extending from a +15 v potential to ground. These lines 15 go to the inverting input of a corresponding one of four operational amplifiers 5A to 5D. The order of succession is from the highest to the lowest in the order 5A to 5D. Having available four such reference voltages as voltage level references (which correspond to the characteristic of FIG. 4), the signal of line 2, which is the actual v/Hz signal, is applied from nodal point $J_1$ to the non-inverting inputs of the respective operational amplifiers 5A to 5D, which belong to level detectors $LD_1$ to $LD_4$, respectively. These form a ladder. Each level detector will operate with regard to lines 11 as a comparator by reference to the threshold defined on line 15. Therefore, depending upon the magnitude of the signal of line 2, one or more of the operational amplifiers (5A to 5D) will output, on a corresponding line 12, a voltage representing a ONE whenever the voltage of line 2 and junction $J_1$ matches, or exceeds the reference voltage, or threshold, for that particular stage of the ladder ($LD_1$, . . or $LD_4$). Accordingly, the presence of one or more ONE's on lines 2 will determine up to which of the comparators $LD_1$, . . $LD_4$ the ladder has been climbed in relation to the inputted v/Hz ratio. All the other comparators, will still have a ZERO on line 12.

In addition, the signal of line 2, beyond junction $J_1$ and by line 20, goes to a voltage-controlled oscillator VCO. Accordingly, at its output (line 30), a series of pulses are generated having a frequency proportional to the magnitude of the voltage of line 20 at the input. Typically, the VCO is a solid state device known as MC 14046B1. The pulses of line 30 are counted by a multiple counter circuit MOC, namely a solid state device MC 14020B1, including four counters of increasing total counts, $Q_1$, $Q_2$, $Q_3$ and $Q_4$, and generating their outputs 13 a logic signal passing from a zero to a ONE when the count-down has been completed. These four counters operate as a cascade of counters when counting, and they are in a one-to-one relationship with respect to the steps of the ladder of level detectors, but they follow the steps of the ladder in the reverse order. Therefore, the lowest count $Q_1$ is related to the high test voltage level detector $LD_1$, the highest count $Q_4$ to the lowest voltage level detector $LD_4$. Accordingly, depending upon the inputted v/Hz ratio level, the delay built up by counting the pulses appearing on line 30 will be lower, or higher. At the same time, due to the inherent gain of the VCO, the magnitude of the signal of line 20 will cause the counting through $Q_1$, $Q_2$, . . . or $Q_4$ to be slower, or faster. This is translated by the slope of EF', FG', GH' or HI' in FIG. 4. This means that the time delay so established will be shorter for a high voltage, and longer for a low voltage, just like illustrated in FIG. 4. It is observed in this respect that as a result the counts, i.e. the delays, of $Q_1$ to $Q_4$, the overall characteristic of FIG. 4 has received on the time axis a scale which is logarithmic. Lines 13 from the respective counters are each matched with one line 12 from level detectors $LD_1$–$LD_4$, by a corresponding AND device. When one of the counters $Q_1$ to $Q_4$ has finished counting, the corresponding line 13 will have a ONE. If such logic ONE on a line 13 matches a ONE on line 12 from the associated level detector, a ZERO will appear at the output of an AND device on line 36. If there is no match, there will be no effect through the AND device. Since the high voltage levels for level detection are associated with the low counts of the multicounter MOC, for high values of the v/Hz ratio on line 2, line 13 will reach a ONE after a low count, and conversely for the low voltage levels. When the time delay defined by a count ($Q_1$, . . or $Q_4$) has expired, a ONE appears on the corresponding line 13 and, if it is matched by a ONE on the selected line 12, the AND device (8A, . . 8D) will output a zero on line 36. OR device 9A passes it to line 37 and flip-flop FFP is set, with the result that, on line 38, the command to trip the relay (not shown) is transmitted. At the lowest level for the signal of line 2, level detector $LD_4$ is the one selected with the highest count $Q_4$. The highest level of the voltage on line 2 causes level detector $LD_1$, with the lowest count $Q_1$, to be selected.

Figure 4:
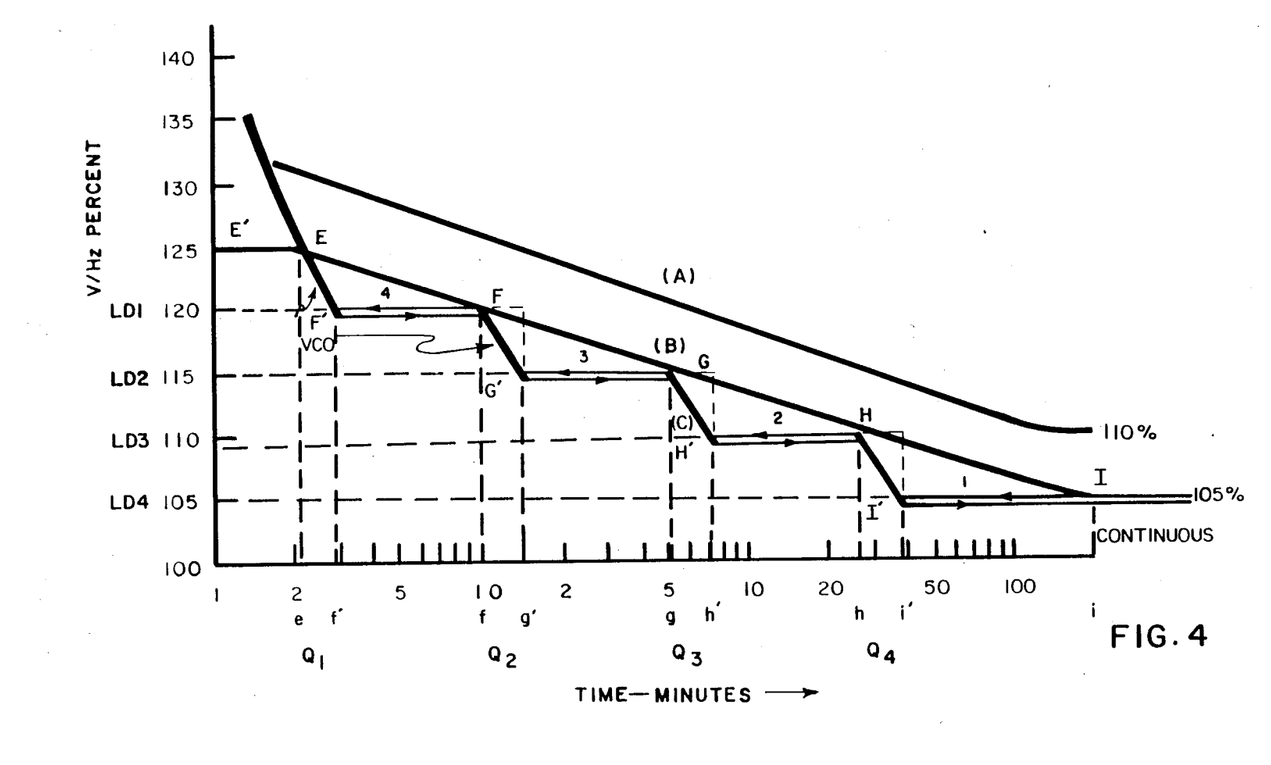
FIG. 4 is a typical graphic representation of the volt/Hz ratio to time response of the timer defined by the circuitry of FIG. 3.

Referring to FIG. 4, it appears in relation to curve (B) that for each level detector, and for the associated counter, there is a characteristic response defined as follows:

EF' for $LD_1$; FG' for $LD_2$; GH' for $LD_3$; and HI' for $LD_4$.

Each of these characteristics cover about 5% of the anticipated range of the inputted ratio range above 100%. Each of these characteristics comes into play when a change in the magnitude of the inputted ratio causes the system to operate with the next level detector. This operation involves hysteresis, as illustrated upon parallel lines I'I, H'H, G'G and F'F by an arrow to the left on the upper line (when the inputted ratio is increasing) and by an arrow to the right on the lower (when the inputted ratio is decreasing).

As shown at the output of operational amplifier 3B, the range of the signal of line 2 is: +2 volts for 1.05 p.u.; +4 volts for 1.10 p.u.; +8 volts for 1.20 p.u.

It appears that the timer according to the present invention defines successive operating zones delineated by EF, FG, GH, and HI on curve (B). The discontinuous succession of operative characteristics EF', FG', GH', and HI' so defined appears to provide a good approximation of the desired curve (B).

It is observed that the number of level detectors and counters determines how many points there are on the overall characteristic of FIG. 4. The levels of the detectors are determined by the reference voltages. The gain of the VCO allows adjusting the slope of EF', FG', GH' and HI'. The frequency of the oscillator in the VCO permits to adjust the time scale. If the counts are digitally represented as $2^m$ for counter $Q_1$, $2^n$ for counter $Q_2$, $2^p$ for counter $Q_3$ and $2^q$ for counter $Q_4$, by adjusting m, n, p and q the distances F'F, G'G and H'H are being adjusted.

Figure 5:
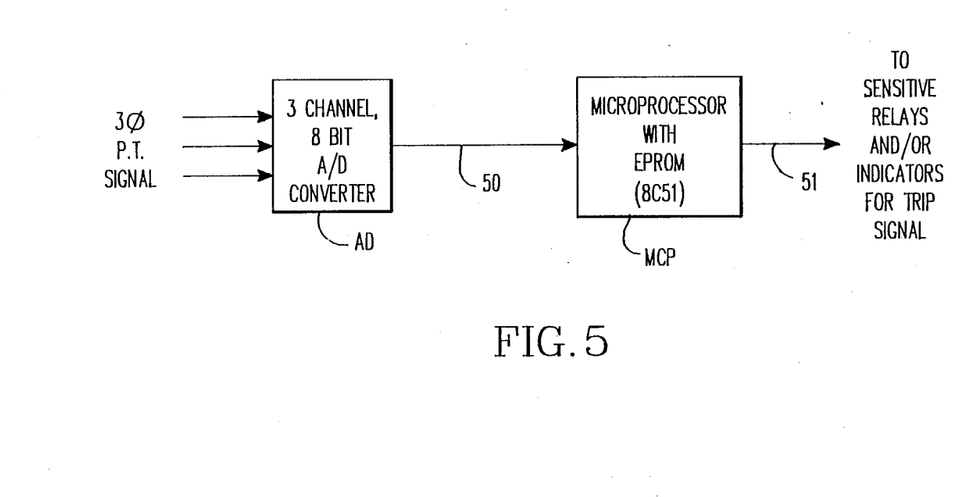
FIG. 5 is representative of an all-digital scheme using, according to the present invention, A/D conversion coupled to a three-phase AC power supply to be disconnected and a computer for sampling the AC waveforms to derive voltage-to-frequency ratios and compute, according to a predetermined characteristic function, corresponding time delays for each particular ratio detected, such time delay being applied to an instantaneous relay for tripping after such computed time relay has expired.

Referring again to the overload versus time function:

$$f(t) = x^n t = k_1,$$

and assuming, for instance, that $k_i = 72,200$ and $n = 39$, another solution to match the user imposed curve (such as curves (A) and (B) of FIG. 1) is to design an all-digital scheme like the one shown as a block diagram in FIG. 5. An analog-to-digital converter with three multiplexed channels is used to sample the three-phase input signal, derived from the generator potential transformers to be protected. Digital information, derived on lines 50 at the output of the A/D converter, is treated by an eight-bit microprocessor MCP containing a programmable read-only memory (EPROM), such as known under the code name INTEL 8051. A software routine continuously samples the three inputs and, over a relatively long period, it computes the average value of the voltage and the frequency, then, calculates the function t=72,200/×, by numerical means such as an infinite series. The computed time t is, thereafter, loaded into an on-board programmable timer and the trip command is generated on line 51 when the timer times out.

I claim:

1. Protective circuit for an AC power system of variable AC voltage and frequency comprising:

means responsive to said AC power system for deriving a volts per Hertz (v/Hz) ratio representative signal;

a voltage-controlled oscillator (VCO) responsive to said v/Hz ratio representative signal for generating a pulse signal having a frequency proportional to said v/Hz ratio representative signal;

a plurality of gating circuits each operative within a corresponding one of a like plurality of successive ranges for the magnitude of said v/Hz ratio representative signal;

time delay means responsive to said pulse signal for generating a plurality of predetermined counts each in relation to a corresponding one of said successive ranges; and means for triggering a circuit breaker in relation to said AC power circuit and in response to one of said gating circuits and upon a corresponding one of said predetermined counts being reached.

2. The protective circuit of claim 1 with said magnitude ranges being selected in accordance with a predetermined inverse-time volts per Hertz circuit breaker response characteristic.

3. The protective circuit of claim 1 with each of said gating circuits including a comparator responsive to said v/Hz ratio representative signal and to a corresponding reference signal for generating a gating signal for said triggering means.

4. The protective circuit of claim 3 with said gating signal being an enable logic signal conditioned by the corresponding count being reached in response to said pulse signal.

5. The protective circuit of claim 4 with said signal deriving means comprising voltage and frequency sensitive amplifier means responsive to said AC power system for deriving a voltage signal representative of the volt per Hertz ratio in said AC power system.

6. The protective circuit of claim 5 with the AC power system having three AC phase lines and said frequency sensitive amplifier means including three voltage and frequency sensitive amplifiers, each being responsive to a corresponding one of said AC phase lines to provide three respective said voltage signals; said three voltage signals being summed up to provide said representative signal.

7. The protective circuit of claim 6 with peak detection means being provided responsive to said summed up three voltage signals for providing a per unit representation of said v/Hz representative signal; said comparators being responsive to per unit reference signals; and said circuit breaker response characteristic being defined per unit.

8. The protective circuit of claim 1, wherein said gating circuits include a ladder of level detectors defining a plurality of voltage steps each characterized by a reference voltage;

with said time delay means including a like plurality of counters in a one-to-one relationship to said voltage steps, said counters being connected to one another in a cascade fashion and in succession from a lower counter to a higher counter thereof, said succession being inversely related to said voltage steps ladder;

said cascaded counters being successively responsive to said pulsed signal for establishing successive counting steps of said ladder by counting upon each successive step up to a maximum count and for establishing, with the last of such successive counting steps, a time delay in relation to said pulsed signal and to said voltage-per-Hertz ratio;

said triggering means including a relay responsive to a concurrence between a voltage step of said ladder and a last maximum count among said cascaded counters to trip in relation to said time delay.

* * * * *